(12) United States Patent
Hart

(10) Patent No.: US 9,363,048 B2
(45) Date of Patent: *Jun. 7, 2016

(54) DOWNLINK OFDMA FOR SERVICE SETS WITH MIXED CLIENT TYPES

(71) Applicant: Cisco Technology, Inc., San Jose, CA (US)

(72) Inventor: Brian D. Hart, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 180 days.

This patent is subject to a terminal disclaimer.

(21) Appl. No.: 14/031,472

(22) Filed: Sep. 19, 2013

(65) Prior Publication Data

US 2014/0016607 A1 Jan. 16, 2014

Related U.S. Application Data

(63) Continuation of application No. 12/819,327, filed on Jun. 21, 2010, now Pat. No. 8,559,323.

(60) Provisional application No. 61/312,633, filed on Mar. 10, 2010.

(51) Int. Cl.
*H04L 5/00* (2006.01)

(52) U.S. Cl.
CPC .............. *H04L 5/0007* (2013.01); *H04L 5/001* (2013.01); *H04L 5/0037* (2013.01); *H04L 5/0055* (2013.01); *H04L 5/0064* (2013.01); *H04L 5/0094* (2013.01); *H04L 5/0023* (2013.01); *H04L 5/0087* (2013.01)

(58) Field of Classification Search
CPC ..... H04L 5/0007; H04L 5/001; H04L 5/0037; H04L 5/0055; H04L 5/0064; H04L 5/0094; H04L 5/0023; H04L 5/0087; H04W 72/04; H04W 72/0406; H04W 72/042; H04W 72/0453; H04W 72/1215

See application file for complete search history.

(56) References Cited

U.S. PATENT DOCUMENTS

| | | | |
|---|---|---|---|
| 5,457,808 | A | 10/1995 | Osawa et al. |
| 5,530,918 | A | 6/1996 | Jasinski |
| 5,905,871 | A | 5/1999 | Buskens et al. |

(Continued)

OTHER PUBLICATIONS

Baker et al., "Downlink Physical Data and Control Channels," LTE— The UMTS Long Term Evolution: From Theory to Practice, Feb. 2009, Chapter 9, pp. 181-206.

(Continued)

*Primary Examiner* — Christopher Grey
(74) *Attorney, Agent, or Firm* — Edell, Shapiro & Finnan, LLC

(57) ABSTRACT

Techniques are provided herein to allow a wireless network access point (AP) to more fully use its bandwidth in order to leverage the different bandwidth capabilities of different types of wireless client devices that the AP serves. The AP generates control parameters for usage of a plurality of channels in a bandwidth during a downlink transmission interval. The control parameters comprise information indicating channel assignments that result in multiple downlink transmissions that at least partially overlap in time to different wireless client devices according to their respective bandwidth capabilities. The AP transmits the control parameters in a control frame in advance of the downlink transmission interval on each of the plurality of channels in the bandwidth.

20 Claims, 7 Drawing Sheets

TYPE 3 CLIENT, e.g., 802.11ac

TYPE 1 CLIENT, e.g., 802.11a/g

AP IS CONFIGURED TO USE SPECTRUM IN A MIXED BASIC SERVICE SET (BSS) TO LEVERAGE CAPABILITIES OF ALL CLIENT TYPES

TYPE 3 CLIENT, e.g., 802.11ac

TYPE 2 CLIENT, e.g., 802.11n

(56) References Cited

U.S. PATENT DOCUMENTS

| | | |
|---|---|---|
| 6,175,571 B1 | 1/2001 | Haddock et al. |
| 6,223,286 B1 | 4/2001 | Hashimoto |
| 6,243,587 B1 | 6/2001 | Dent et al. |
| 6,349,210 B1 | 2/2002 | Li |
| 6,370,142 B1 | 4/2002 | Pitcher et al. |
| 6,392,993 B1 | 5/2002 | Hamilton et al. |
| 6,501,957 B2 | 12/2002 | Muhonen et al. |
| 6,567,851 B1 | 5/2003 | Kobayashi |
| 6,633,765 B1 | 10/2003 | Maggenti |
| 6,647,020 B1 | 11/2003 | Maher et al. |
| 7,013,157 B1 | 3/2006 | Norman et al. |
| 8,559,323 B2 * | 10/2013 | Hart .............................. 370/252 |
| 2002/0058493 A1 | 5/2002 | Ikeda et al. |
| 2002/0102999 A1 | 8/2002 | Maggenti et al. |
| 2003/0032391 A1 | 2/2003 | Schweinhart et al. |
| 2003/0072321 A1 | 4/2003 | Salloum Salazar et al. |
| 2003/0073443 A1 | 4/2003 | Bae et al. |
| 2003/0073453 A1 | 4/2003 | Basilier |
| 2003/0143982 A1 | 7/2003 | Wolters et al. |
| 2003/0153280 A1 | 8/2003 | Kopp et al. |
| 2004/0132448 A1 | 7/2004 | Torres et al. |
| 2004/0165559 A1 | 8/2004 | Kwak et al. |
| 2004/0196917 A1 | 10/2004 | Toshimitsu |
| 2004/0248579 A1 | 12/2004 | Fukui et al. |
| 2004/0252701 A1 | 12/2004 | Anandakumar et al. |
| 2005/0030885 A1 | 2/2005 | Langley et al. |
| 2007/0047485 A1 | 3/2007 | Gorokhov et al. |
| 2008/0075005 A1 * | 3/2008 | Kim et al. .................... 370/230 |
| 2009/0303941 A1 * | 12/2009 | Naka et al. .................... 370/329 |
| 2010/0260138 A1 * | 10/2010 | Liu et al. ........................ 370/330 |
| 2011/0110443 A1 * | 5/2011 | Kwon et al. ................... 375/260 |
| 2011/0222486 A1 | 9/2011 | Hart et al. |

OTHER PUBLICATIONS

English translation of Office Action in Chinese Application No. 201180013204.3, issued May 30, 2014, 9 pages.

3GPP TS 36.213 V9.0.0 (Dec. 2009) Technical Specification, 3rd Generation Partnership Project; Technical Specification Group Radio Access Network; Evolved Universal Terrestrial Radio Access (E-UTRA); Physical layer procedures (Release 9); Dec. 2009, (81 pages).

Baker et al., XP-002576365, "Downlink Physical Data and Control Channels", LTE—The UMTS Long Term Evolution, John Wiley & Sons, Ltd. (pp. 181-206).

"LTE—Advanced Physical Layer", Baker, M., Alcatel-Lucent IMT Advanced Evaluation Workshop, 3GPP TSG RAN WG1, XP-002637658m, REV-090003r1, Dec. 2009, (48 pages).

Hamalainen et al., "WCDMA Adjacent Channel Interference Requirements", 1999 IEEE Vehicular Technology Conference, vol. 5, Sep. 22, 2009, (pp. 2591-2595).

Lough et al., "A Short Tutorial on Wireless LANs and IEEE 802.11", XP-002965052, The Bradley Department of Electrical and Computer Engineering, Virginia Polytechnic Institute and State University, Blacksburg, VA, 1997, (pp. 1-5).

English Translation of third Office Action in counterpart Chinese Application No. 201180013204.3, dated Jul. 27, 2015, 5 pages.

* cited by examiner

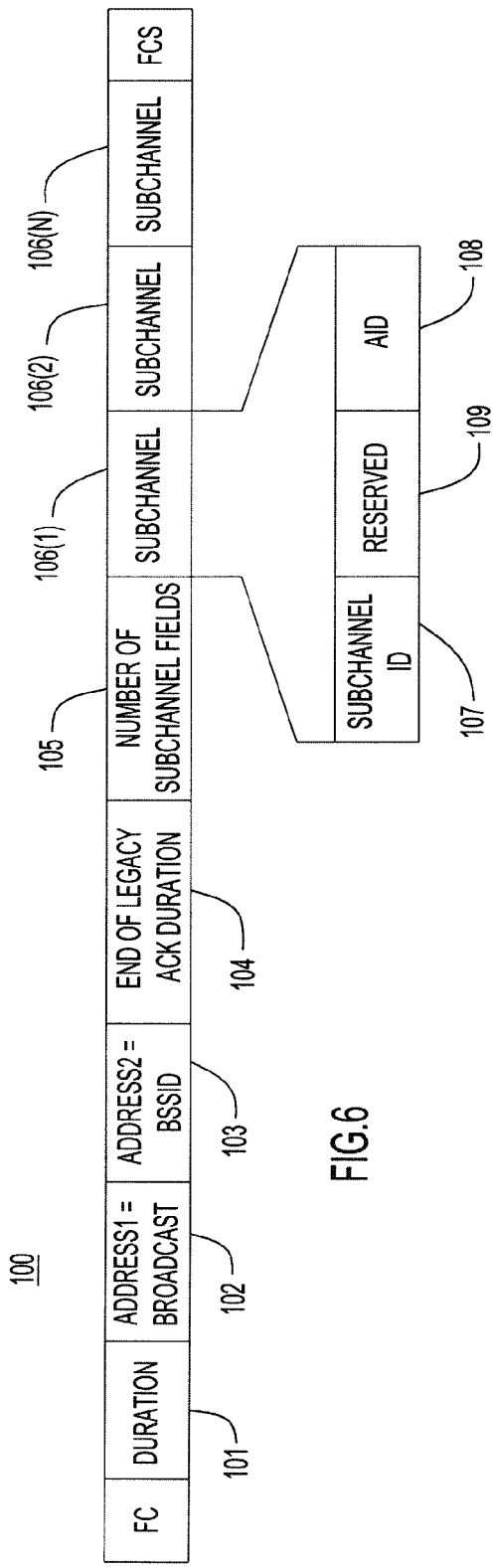

DOWNLINK OFDMA FOR SERVICE SETS WITH MIXED CLIENT TYPES

RELATED APPLICATION

This application is a continuation of U.S. Non-Provisional application Ser. No. 12/819,327, filed Jun. 21, 2010, which in turn claims priority to U.S. Provisional Patent Application No. 61/312,633, filed Mar. 10, 2010. The entirety of each of these applications is incorporated herein by reference.

TECHNICAL FIELD

The present disclosure relates to wireless local area networks and more particularly to better use spectrum available to a wireless access point (AP) that services a Basic Service Set (BSS) comprising a mix of different types of client devices.

BACKGROUND

In a wireless local area network (WLAN), such as an IEEE 802.11 WLAN, future networks will allocate wider bandwidth channels, e.g., 80 MHz or more, to individual client devices. In sparse home WLAN deployments, this can be quite advantageous. The wider bandwidth channel is valuable due to the additional speed it offers, but this benefit may go unrealized if the bandwidth is not fully used. For example, some legacy 802.11 client devices can support only 20 or 40 MHz channels and their presence in the network can block the full use of the wider bandwidth by more current (higher bandwidth) client devices. In the worse case, a transmission for a single 20 MHz channel client device could block all other client devices (that are capable of operating with wider bandwidth channels) in the same BSS from accessing the remaining bandwidth available to the AP during the transmission (e.g., 60 MHz), making the 80 MHz or wider channel not fully used in a home or enterprise deployment.

BRIEF DESCRIPTION OF THE DRAWINGS

FIG. 6 is a diagram illustrating an example of a control frame that the AP transmits to notify client devices of a spectrum usage scenario for a downlink transmission session according to the techniques described herein.

FIG. 7 is an example of a diagram of a packet header for one of the fields in a data frame shown in FIG. 5.

DESCRIPTION OF EXAMPLE EMBODIMENTS

Overview

Techniques are provided herein to allow a wireless network access point (AP) to more fully use the bandwidth in order to compensate for and to leverage the different bandwidth capabilities of different types of wireless client devices that the AP serves. The AP generates control parameters for usage of a plurality of individual channels in a bandwidth during a downlink transmission interval. The individual channels may be viewed as "subchannels" with respect to the overall bandwidth, and for this reason, the term subchannel is used herein to refer to an individual channel. The control parameters comprise information indicating channel assignments for multiple downlink transmissions that at least partially overlap in time to different wireless client devices according to their respective bandwidth capabilities and information indicating timing for transmissions of acknowledgment messages by client devices to the access point. The AP transmits the control parameters in a control frame in advance of the downlink transmission interval on each of the plurality of channels in the bandwidth.

The downlink frames to different types of client device overlap, at least partially in time, and as a result, the AP is more fully using its available bandwidth. The mechanism described herein operates in a manner similar to orthogonal frequency division multiple access (OFDMA) techniques, albeit coarsely, across different subchannels (e.g., 20 MHz subchannels) and is therefore referred to herein as a downlink-OFDMA technique, or DL-OFMDA.

Example Embodiments

Figure 1:
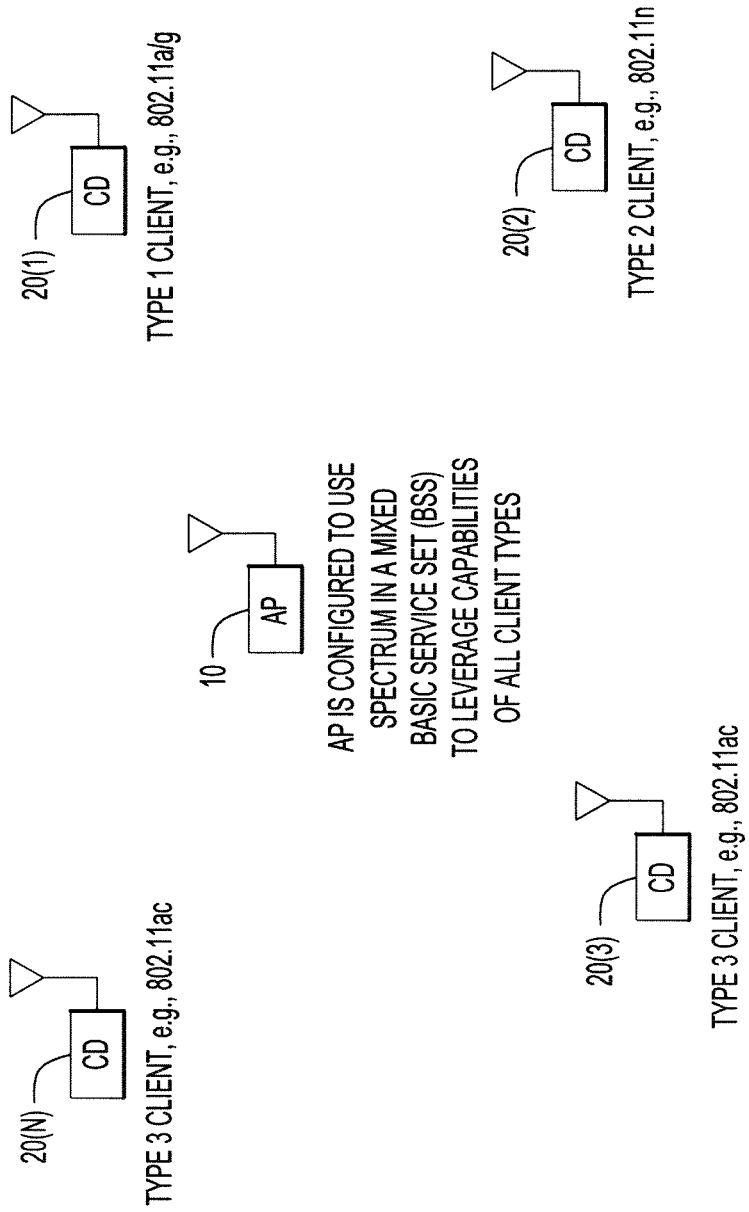
FIG. 1 is a block diagram showing an example of a wireless network deployment in which a wireless network access point (AP) device is serving multiple client devices of different bandwidth capabilities or types.

Referring first to FIG. 1, a wireless network environment is shown at reference numeral 5 comprising a wireless access point (AP) 10 and a plurality of client devices (CDs), e.g., CDs 20(1)-20(N). The AP 10 and the CDs 20(1)-20(N) are configured to perform wireless communication according to a wireless network communication protocol such as the IEEE 802.11 wireless local area network (WLAN) communication protocol, known commercially as WiFi™. The CDs are also referred to herein as "stations" or "STAs".

In a given network deployment, the AP 10 may be called upon to serve a variety of different types of client devices that have different bandwidth capabilities. A network deployment may involve older types of client devices that were designed to operate according to rules of the 802.11 standard that have since been improved upon in later versions to allow for better performance (higher throughput) and fuller usage of the spectrum. The different versions of the 802.11 standard involve different modulation schemes and also different usage capabilities of the spectrum. That is, IEEE 801.11n standard and the future 802.11ac standard allow for multiple adjacent channels to be bonded together to form a single wider bandwidth channel, which allows for very high throughput. Future 802.11ac devices may even operate on two non-adjacent sets of bonded channels; e.g. to form 160 MHz from two 80 MHz segments. For example, a network deployment may include 802.11a/g client devices, 802.11n client devices, and soon in the future, 802.11ac client devices.

It is common today, and also inevitable in the future, that a given AP will be serving a plurality of client devices in a Basic Service Set (BSS) having a mixture of physical (PHY) layer capabilities based on their version or type. For example, as shown in FIG. 1, the client device (CD) 20(1) is an 802.11a/g device (called Type 1), CD 20(2) is an 802.11n device (called Type 2), CD 20(3) is an 802.11ac device (called Type 3) and CD 20(N) is a 802.11ac device. In other words, the AP 10 is configured to serve a plurality of CDs such that at least one CD has a higher bandwidth capability with respect to downlink transmissions sent by the AP 10 in two or more adjacent channels bonded together and at least one other CD served by the AP 10 has lower bandwidth capability with respect to downlink transmission sent by the AP 10 in a single channel or in two or more adjacent channels bonded together.

Figure 2:
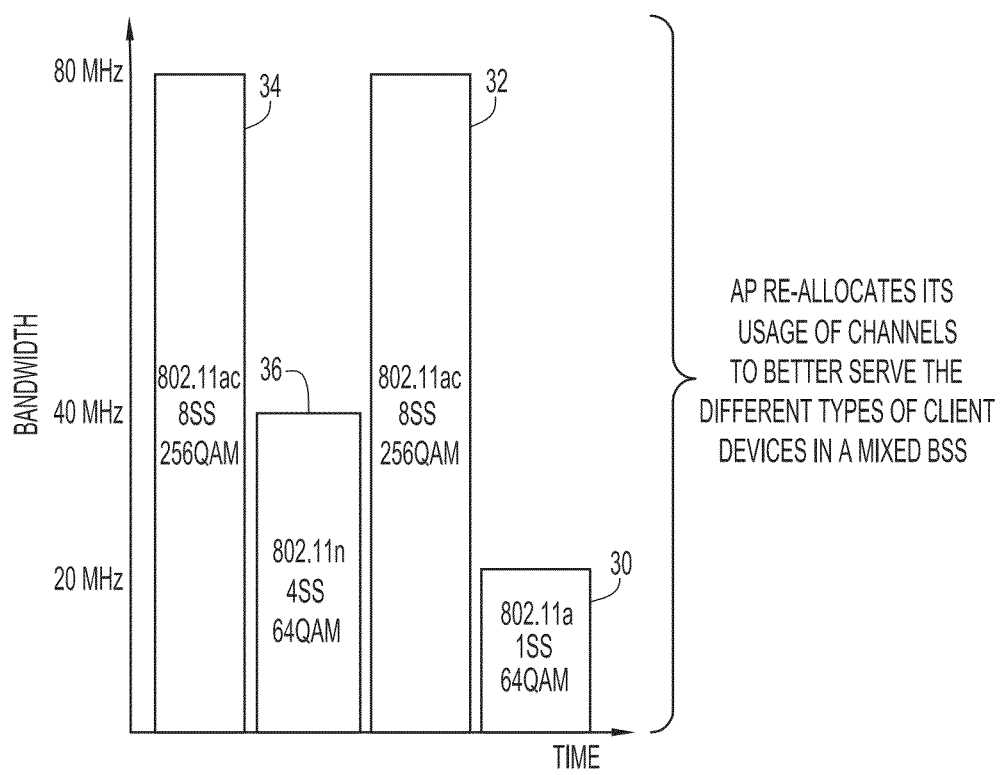
FIG. 2 is a diagram showing how spectrum usage of an AP device serving a plurality of different types of client devices can be improved using the techniques described herein.

Reference is now made to FIG. 2. FIG. 2 illustrates a spectrum usage diagram for a BSS with a mixture of different types of CDs. This diagram shows that legacy CDs, such as 802.11a devices, use a small portion of the spectrum (e.g., 20 MHz) with a 64 quadrature amplitude modulation (QAM) scheme at reference numeral 30 whereas an 802.11ac device which uses 80 MHz of the available spectrum with a 256 QAM scheme as shown a reference numerals 32 and 34. Also, an 802.11n device uses as much as 40 MHz of the spectrum with a 64 QAM scheme as shown at reference numeral 36. The duration of an 802.11ac downlink transmission can be up to a few milliseconds, and comparable to the duration for an 802.11a/g/n transmission, yet the 802.11a/g/n devices are still only using a small portion of the available spectrum. Likewise, an 802.11n device uses a larger portion of the spectrum than an 802.11a device. Thus, in an 80 MHz BSS, 60 MHz of bandwidth is wasted for legacy 802.11a devices and 40 MHz of bandwidth is wasted for legacy 802.11n devices. In general, an 802.11ac AP will be working at far below its rated capabilities whenever there are 802.11a and 802.11n transmissions occurring in the BSS.

The AP resources are underutilized and its capabilities are wasted for much of the time. This underutilization reduces a user's motivation to upgrade the AP to a newer 802.11 protocol and consequently to upgrade CDs.

The way that a mixed BSS has been managed using current techniques is to have the AP use a medium access control (MAC) address to protect the spectrum for use by the various types of CDs. This does not improve the utilization of the spectrum and in fact decreases efficiency.

According to the techniques described herein, the AP is configured to re-allocate its usage of the channels in its available frequency spectrum to better serve the different types of CDs (CDs of different bandwidth capabilities) in a mixed BSS. In a network deployment in which there is one or more device capable of higher bandwidth, there are ways to recover the wasted bandwidth by taking advantage of orthogonal frequency divisional multiple access (OFDMA)-like schemes used for downlink (DL) transmissions. The techniques described herein employ multiplexing in the frequency dimension.

Figure 3:
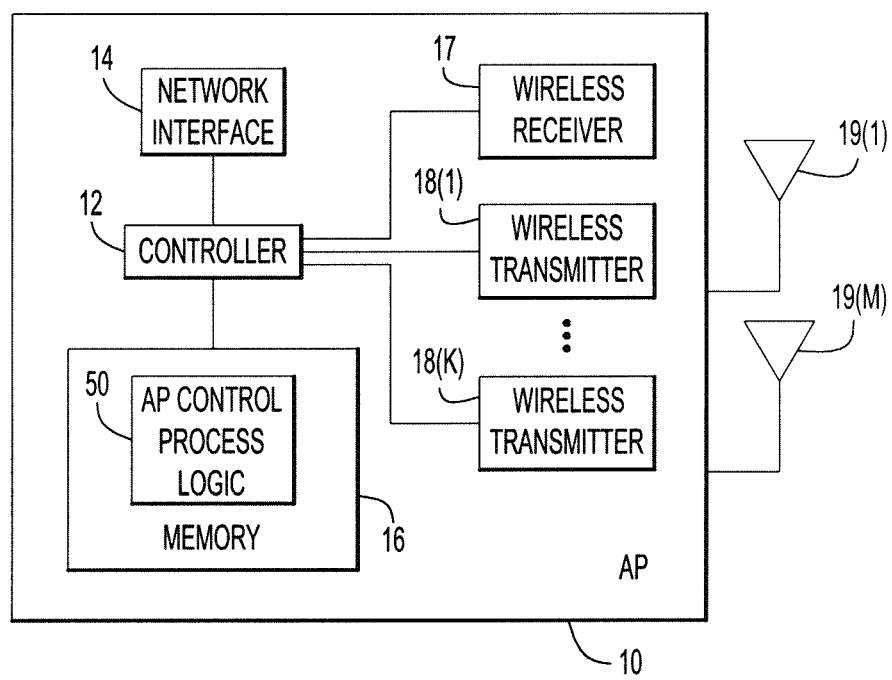
FIG. 3 is an example of a block diagram of an AP device configured to more fully use the spectrum when serving a plurality of client devices of different types.

Turning now to FIG. 3, an example block diagram is described of the AP 10 that is configured to perform the improved spectrum utilization techniques described herein. The AP 10 comprises a controller 12, a network interface 14 for wired network communications, memory 16, a wireless receiver 17, and a plurality of wireless transmitters 18(1)-18(K). The AP 10 also comprises one or more antennas 19(1)-19(M). While only a single wireless receiver 17 is shown, this is by way of example only and in fact only one receiver is required. However, it is possible that the AP 10 may have multiple receivers. Moreover, it is possible that a single transmitter may be used to perform the functions of the plurality of transmitters 18(1)-18(K). Thus, for simplicity, the block of transmitters 18(1)-18(K) may be implemented by at least one transmitter.

The WLAN receiver 17 performs the necessary baseband signal demodulation as well as radio frequency (RF) receive processing for WLAN communications, and to this end, comprises, one or more integrated circuit (IC) chips for these functions. The multiple wireless transmitters 18(1)-18(K) are each capable for performing the necessary baseband signal modulation and RF transmit process functions. The controller 12 is, for example, a microprocessor or microcontroller, or alternatively is a programmable digital signal processor, or a fixed or programmable digital logic device.

The memory 16 stores data that is used by the controller 12 for controlling functions of the AP 10. In addition, the memory 18 stores instructions for AP control process logic 50 that, when executed by the controller 12, cause the controller to perform the operations described herein in connection with FIG. 4 and the techniques depicted in FIGS. 5-8. Thus, the memory 16 is an example of a tangible processor or computer readable memory medium that stores instructions which, when executed by a processor, cause the processor to perform the spectrum allocation operations for the AP described herein when the AP sends downlink transmissions to CDs.

The techniques described herein are designed such that the AP 10 is configured to be transmitting or receiving, but never both simultaneously. In addition, the AP has multiple transmitters but needs only a single receiver capable of receiving on one of a plurality of channels at any time. The AP can use single MAC contention techniques.

Figure 4:
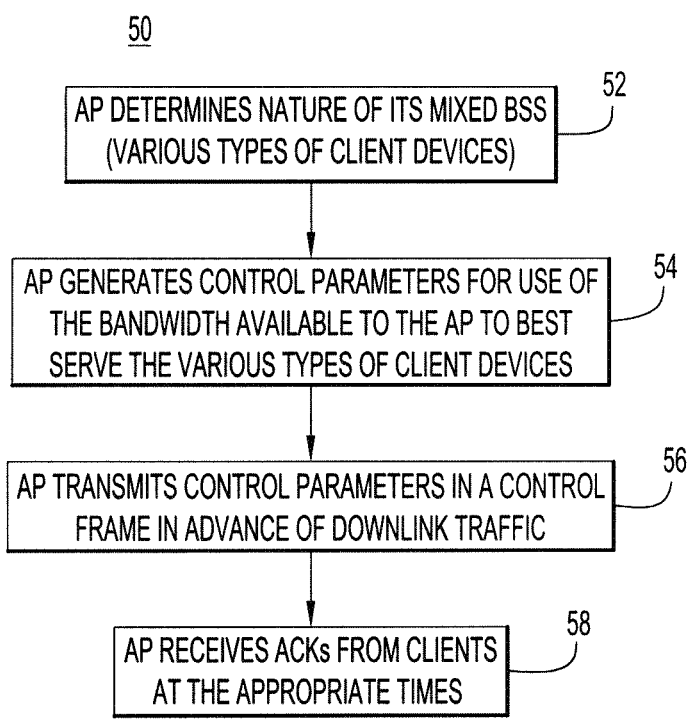
FIG. 4 is an example of a flow chart showing the operations of the AP device configured to more fully use the spectrum when serving a plurality of client devices of different types.

Reference is now made to FIG. 4 for a description of the AP control process logic 50. At 52, the AP determines the nature of its mixed BSS that it is serving, that is, the various types of client devices and from this information determines the spectrum usage capabilities, i.e., a) bandwidth capabilities of the CDs that it the AP is serving, and b) support for the DL-OFDMA mechanism (e.g. IEEE 802.11ac and future devices) described herein. When a client device associates to the AP, the AP learns through uplink transmissions received from the CDs (when they initially associate to the AP), with which version of the IEEE 802.11 standard the CD is compliant. For example, at 52, the AP learns whether there are 802.11a devices, 802.11n devices, 802.11ac devices, etc., operating in the BSS that the AP is serving. Also, the AP will know the protocol compliance/capability for each specific CD, and stores this information indexed by a client device identifier. For example, at least one CD served by the AP is capable of DL-OFDMA and has a higher bandwidth capability with respect to downlink transmissions in one channel or several adjacent channels bonded together and at least one wireless client device has a lower bandwidth capability with respect to downlink transmissions in one channel or several adjacent channels bonded together.

At 54, the AP generates control parameters for use of the bandwidth available to the AP to best serve the various types of client devices. Prior to generating the control parameters, the AP may contend for the bandwidth to determine availability of a plurality of channels for downlink transmissions so that the control parameters are based the plurality of channels determined to be available to the AP at the time the AP contends for the bandwidth for a downlink transmission interval or session. The control parameters comprise information indicating channel assignments for multiple downlink transmissions that at least partially overlap in time to different CDs according to their respective capabilities and, in one form, information indicating timing for transmissions of acknowledgment (ACK) messages by CDs to the AP.

In one form, ACK messages for the higher bandwidth CDs need not be scheduled and the techniques described herein allow for a polled ACK mechanism. In a polled ACK mechanism, the AP subsequently contends for access to the channel and requests an ACK message, e.g., via a Block ACK Request (BAR) and the CD responds, e.g., with a BA. The AP polls each CD in turn for an acknowledgment.

At 56, the AP transmits the control parameters in a control frame in advance of the downlink transmission interval. The control frame alerts the higher bandwidth CDs that are part of the DL transmission interval that understand the DL-OFDMA mechanism (e.g., 802.11ac CDs) as to which channel(s) to receive their DL transmission(s) and, in one form, also when to send their respective ACK messages. CDs that do not support the DL-OFDMA mechanism, e.g., 802.11a and 802.11n CDs continue to listen for packets sent in their various operating channels that include a primary channel. At 58, the AP receives ACK messages from the CDs that were part of the downlink transmission interval at the appropriate times as described hereinafter. The control parameters, how they are transmitted and examples for the timing of the ACK messages are described hereinafter in connection with FIGS. 5-8. The term ACK used herein is meant to refer to an acknowledgment message of any type, including a standard acknowledgment message sent by a client device in response to receiving an individual packet unit as well as a Block Acknowledgment (BA) which is transmitted to acknowledge multiple packet units together. Reference is also made herein to a so-called "fake" downlink ACK that is transmitted by the AP, which is described hereinafter.

Figure 5:
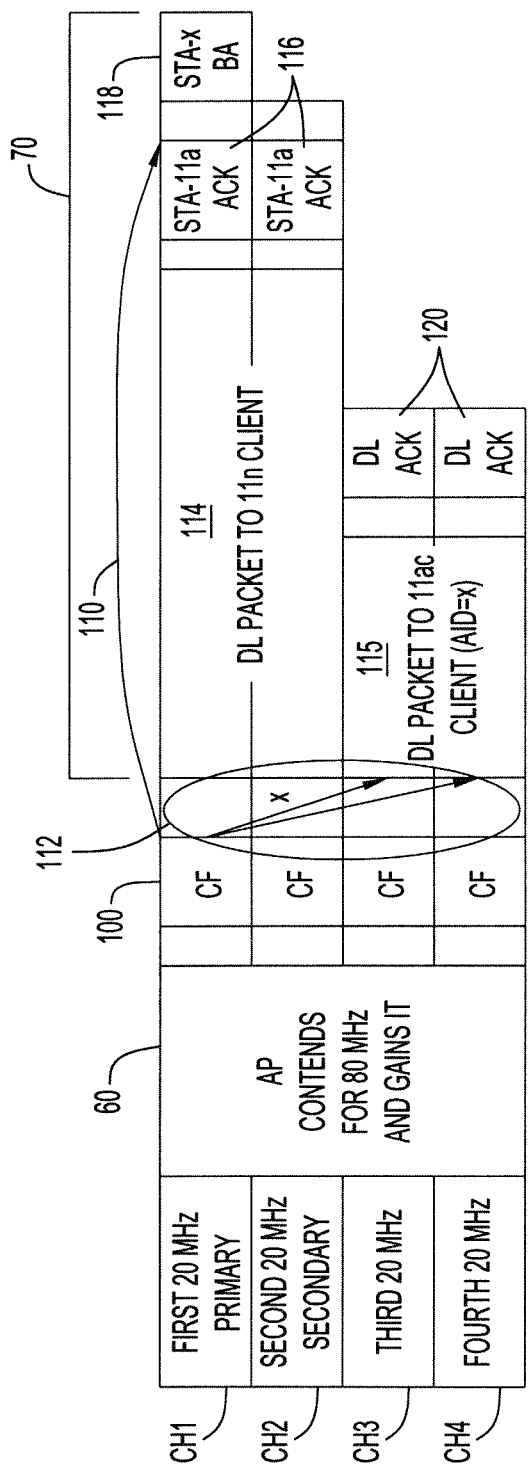
FIG. 5 is a spectrum usage and timing diagram showing one example by which an AP is configured to more fully use the spectrum across multiple channels when serving a plurality of client devices of different types.

Reference is now made to FIG. 5 for a first example of the control parameters that the AP transmits to the client devices in its BSS. In this example, there are a first (primary) channel CH1, a second (secondary) channel CH2, a third channel CH3 and a fourth channel CH4, each 20 MHz wide for example. Also in this example the AP determines that there are two types of devices that it has frames for: 802.11ac and 802.11n. At 60, the AP contends for the entire or some designated portion of the bandwidth that is available to it (e.g., 80 MHz) and gains it. Any now known or hereinafter developed multi-channel contention mechanism may be used by the AP at 60 that tends to minimize collisions and maximizes fairness and throughput.

Next, the AP sends a control frame (CF) 100. The control frame 100 contains information for the various client devices as to which one or more of the four channels to expect their transmissions for a given DL transmission interval or session shown at reference numeral 70.

The AP transmits the control frame 100 on each of the four channels as shown in FIG. 5. Moreover, as explained further in connection with FIG. 6, the Physical Layer Convergence Protocol (PLCP) header in each DL 802.11ac packet 115 to an 802.11ac CD indicates the subchannels of each frame in the DL-OFDMA Transmit Opportunity (TXOP). A TXOP is a time interval obtained, through contention techniques, for transmissions by a device, such as DL transmissions by the AP during a DL transmission interval.

The AP 10 can configure the control frame 100 to set different Network Allocation Vectors (NAVs) per subchannel, otherwise the control frame contents are the same and comprises a) a duration to end-of-legacy-ACK (EOLA) for ACK scheduling, the duration to the EOLA ACK represented by the arrow 110 in FIG. 5 (omitted, if polled ACKs are always used; or set to 0 as a flag that polled ACKs are requested here, if both scheduled and polled ACKs are allowed), and b) subchannel assignments by CD identifier which is an Association Identifier (AID) assigned by the AP to a CD, and represented by the arrows at reference numeral 112.

Still referring to FIG. 5, the control frame 100, in this example, indicates that the third and fourth channels are being bonded together for a single DL packet to an 802.11ac client device with CD identifier (AID)="x". Client device "x" will then know to receive its transmission on the third and fourth channels (bonded together). The control frame is broadcasted at a basic rate for legacy CDs (a low rate understood by all CDs in the BSS), which in this example, assuming no nearby 802.11a devices, is the rate for 802.11n devices.

The 802.11n DL packet shown at 114 is the legacy frame in the example of FIG. 5 and in this example the AP sends the legacy DL packet 114 on the first and second channels bonded together. However, the AP does not include any information in the control frame 100 about the legacy frame on the first and second channels because, again, the control frame 100 is intended for decoding by higher bandwidth CDs (e.g., 802.11ac CDs) and 802.11a and 802.11n CDs do not understand and thus ignore the control frame 100. Typically the 802.11n CD is the device with the slowest data rate and/or lower bandwidth capability among the CDs that are destinations for a DL transmission during the DL transmission interval. The legacy DL frame 114 needs to be the longest frame in the DL transmission interval so all DL transmissions end before ACK reception begins. This significantly simplifies AP hardware implementation. The ACK message to be sent by a legacy CD and other non-legacy CDs that are destinations for DL transmissions are to be sent in sequential order thereafter on the first subchannel as described hereinafter.

The DL packet to 802.11ac CD is shown at 115 is transmitted on the third and fourth channels. In one form, the control frame 100 is further configured to cause the higher bandwidth 802.11ac CD "x" (referred to as "STA-x" in FIG. 5) to send its BA shown at 118 after the legacy CD sends its ACK at 116 via the duration to the EOLA ACK 110. On the other hand, 11a/11n CDs do not understand the control frame and immediately send an ACK automatically (in the case of 802.11a) or if requested by a legacy data packet (as is the case for certain 802.11n frames). Thus, as depicted in FIG. 5, the control parameters in the control frame indicate channel assignments that result in multiple downlink transmissions to different client devices that at least partially overlap in time during a downlink transmission interval according to the respective bandwidth capabilities of the different client devices. In one form, information is included in the control parameters to indicate the timing for transmissions of ACK messages by the higher bandwidth DL-OFDMA capable client devices to the AP. The control parameters indicate, during the downlink transmission interval, that a downlink transmission will be sent in one channel or several adjacent channels bonded together to at least one wireless client device that has a higher bandwidth capability.

As an alternative to the sequencing of ACK messages, a time interval padding may be used on the non-primary channels (the second, third and fourth channels) and the ACK messages are frequency division multiplexed or sent sequentially on the non-primary channels after the DL transmissions on the non-primary channels are completed.

In general, it is implicit that all ACK messages to be transmitted by CDs that are the destination of a DL frame in the DL transmission interval are to be on a particular channel or channels (e.g., the primary channel and the adjacent secondary channel) corresponding to a channel to be used for DL transmissions to CDs having lower bandwidth capability that are part of the DL transmission session/interval. Moreover, information indicating a duration or time interval from the end of the control frame 100 to the completion of the ACK message from the CD having the lower bandwidth capability (e.g., the duration to EOLA 110) is specified in the control frame. However, the AP may use polled ACK techniques instead of scheduling ACKs using the duration to EOLA information 110 for the higher bandwidth CDs.

As explained above, the control frame 100 may be configured to set a different NAV per channel to protect the information for the DL frames and ACK messages. The NAV is the virtual carrier sensing mechanism used with wireless network protocols such as IEEE 802.11 and IEEE 802.16. The virtual carrier sensing is a logical abstraction which limits the need for physical carrier sensing at the air interface in order to save power and increased reliability. The MAC layer frame headers contain a duration field that specifies the transmission time required for the frame, in which time the medium will be busy. The stations listening on the wireless medium read the duration field and set their NAV, which is an indicator for a station on how long it must defer from accessing the medium. Wireless stations are often battery powered, so in order to conserve power the stations may enter a power-saving mode. The stations decrement its NAV counter until it becomes zero, at which time they awaken to sense the medium again. The NAV virtual carrier sensing mechanism is a prominent part of the CSMA/CA random access protocol used with IEEE 802.11 WLANs.

The spectrum allocation scheme depicted in FIG. 5 can be viewed as a scheme wherein the control parameters in the control frame includes information indicating channel assignment for downlink transmissions in a subset of the plurality of channels to one or more client devices having the higher bandwidth capability while implicitly one or more devices having the lower throughput capability receive downlink transmissions in one or multiple channels bonded together in a different subset of the plurality of channels than the subset of channels allocated for the downlink transmission to the higher bandwidth wireless client devices. The subset of the plurality of channels allocated for the higher bandwidth client devices does not overlap with one or more of the plurality of channels used for a downlink transmission to a client device having a lower bandwidth capability A further feature of the control frame 100, which is optional, is for the AP to transmit a so-called "fake" DL ACK shown at 120 to make for fair access to the channel for 802.11ac and 802.11n client devices. Non-802.11ac Overlapping BSS (OBSS) client devices will perform Extended Interframe Spacing (EIFS) after the DL packet 115. Thus, the fake DL ACKs shown at 120 achieve fairness with 802.11ac OBSS client devices. In this way, 802.11n and 802.11ac client devices have an equal chance to transmit on the non-primary channels after the DL packet 115. The DL ACKs shown at 120 are "fake" because it is understood that an AP does not normally send a DL ACK which is not actually acknowledging anything. The AP generates and transmits a DL ACK as a means to allow all client devices to decode it and therefore realize that the channel is occupied so that they do not contend for it. Said another way, the AP transmits on the subset of channels allocated to a higher bandwidth CD messages that are configured as ACK messages to cause other devices that detect the ACK messages (transmitted by the AP) to refrain from contending for the subset of channels and after a period of time to allow for contention to that subset of channels. Again, as explained above, the control frame includes information to indicate that ACK messages from the one or more CDs having the higher bandwidth capability are to be sent, in sequence by specific CD, subsequent the last ACK message from the one or more CDs having the lower bandwidth capability.

Furthermore, the AP generates the control parameters to schedule frames for a lower bandwidth capability CD that are longer in duration than for frames for higher bandwidth CDs so that the AP need only transmit or receive at any given time but not transmit and receive at the same time.

Turning now to FIG. 6, one example of the control frame 100 is shown. The control frame 100 comprises a Duration field 101, a first address (Address 1) field 102, a second address (Address 2) field 103, an EOLA Duration field 104, a Number of subchannels fields field 105, and one or more Subchannel fields 106(1)-106(N). Each Subchannel field 106 (i) comprises a Subchannel ID field 107 and an AID subfield 108 and a Reserved field 109.

The Duration field 101 specifies the time duration of the control frame from start to finish. The control frame 100 is a variable length frame. A fixed length may be used up to 8 subchannels*4 AIDs/subchannel*1.5 octets/AID=48 octets+ 20 MAC bytes.

The Address 1 field 102 specifies a Broadcast address for a given BSS so that all CDs in the BSS receive and decode the control frame 100. The Address 2 field 103 specifies the BSS identifier (BSSID) for the BSS since that is the target of the control frame 100. The EOLA Duration field 104 indicates the time interval from the end of the control frame 100 to the end of the legacy ACK frame as shown at 110 in FIG. 5.

The Number of subchannel fields field 105 indicates the number of Subchannel fields 106(1)-106(N). In an alternative form, one Subchannel field is used and the CDs can obtain the full list of subchannels from the PLCP header of the DL data frame. A DL frame sent to a given AID across N subchannels requires N subchannel fields. Within a given Subchannel field 106(i), the Subchannel ID field 107 includes information that identifies a 20 MHz channel within up to 160 MHz of bandwidth (e.g., using 3 bits). For example, one 40 MHz 11ac client uses 27 octets or 60 µs at 6 Mbps (802.11a). This corresponds to the information represented by the arrows shown at 112 in FIG. 5. Multiple AIDs may be used per subchannel in order to support DL-Multi-User Multiple-Input Multiple-Output (MIMO). As an alternative, there may be one subchannel ID field per CD. The AID subfield may be shortened to obtain additional bits for a larger subchannel ID field (a 4 or 8 bit bitmask with 1 bit per 20 MHz subchannel).

The control frame 100 is unsecured because, by its nature, it is transmitted shortly before the actual DL frames and thus there is not sufficient time to negotiate and transmit security information to the CDs. Providing for an unsecured control frame introduces the possibility of a new type of denial of service attack on target clients. The attacking device may regularly send a bogus control frame directing selected AIDs to a non-primary/secondary (little-used) subchannel and then after a Short Interframe Spacing (SIFS), the attacking device sends a long packet on the indicated subchannel.

During this attack, the selected client devices that are the target miss packets sent by the AP on the other subchannels, e.g., on the primary/secondary subchannels. The attack requires the attacker to transmit more or less continuously. A target client device can mitigate the attack as follows. If there is no energy on the primary channel after the (SIFS), or energy on the primary channel disappears well before EOLA Duration-SIFS-TXTIME (ACK or BA), then an attack can be determined to be occurring.

In general, the PLCP header of each DL packet/frame self-announces the subchannels occupied by the packet. This self-announcement can be as simple as a 20/40/80/160 MHz indication, and thus 2 bits suffice. With DL-OFDMA, an extension is possible wherein the number of bits depends on the maximum bandwidth and minimum bonding assumed within DL-OFDMA for an 802.11ac device. Options include:

1. One bit per subchannel, so that 80 MHz maximum requires 4 bits (1,2,3,4) but 160 MHz max requires 8 bits (1,2,3,4,5,6,7,8); or 2. With more bonding (aggregating) of the "higher" subchannels so that 80 MHz maximum requires 3 bits (1,2,3+4) and 160 MHz max requires 5 bits (1,2,3+4,5+6,7+8).

FIG. 7 shows the sample encodings used in a DL-OFDMA transmission, for two 802.11ac CDs and one legacy CD. The AP covers a bandwidth of 160 MHz, covering channels 36-64. The legacy CD automatically listens on the primary channel (channel 36) and receives it legacy packet that way. The first 802.11ac CD's data packet is on channels 44 and 48 bonded together, which is indicated by the encoding "00100" (i.e. 3+4 which is 44+48 in this BSS) sent in the PLCP header of that data packet. The second 802.11ac CD's data packet is on channels 52-64, which is indicated by the encoding "00011" (i.e. 5+6,7+8 which is 52+56 and 60+64 in this BSS). The constraint that the legacy DL frame be the longest frame is not too restrictive. With aggregation of data units (in time) to be transmitted, the AP can lengthen an 802.11n frame without over-lengthening the 802.11ac frames. During early adoption of 802.11ac, 802.11a/802.11n frames will dominate, so there is "always" a legacy frame for an 802.11ac data unit on which to "piggyback". During the latter stages of 802.11ac adoption, 802.11ac frames will dominate, so there is "always" an 802.11ac data unit to transmit alongside slower legacy frames.

The spectrum allocation techniques described herein work for broadcast frames as well. Broadcast frames are sent on channels always including the primary channel, and not in parallel with DL-OFDMA frames during the same TXOP.

In a variation, the transmission of the control frame could be avoided by the AP pre-assigning selected client devices to different subchannels for reception purposes. For example, the primary channel becomes the primary channel for transmission, but different client devices have different primary channels for reception. This works well for unicast transmissions, but broadcast transmissions need either to be duplicated across subchannels or the AP sends a control frame to temporarily move client devices back to the primary channel in order to receive broadcast transmissions in much the same way as shown in FIG. 5, but with the control frame including information pointing client device "x" from, for example, the third subchannel back to the first subchannel to receive a DL broadcast packet on the primary channel.

Figure 8:
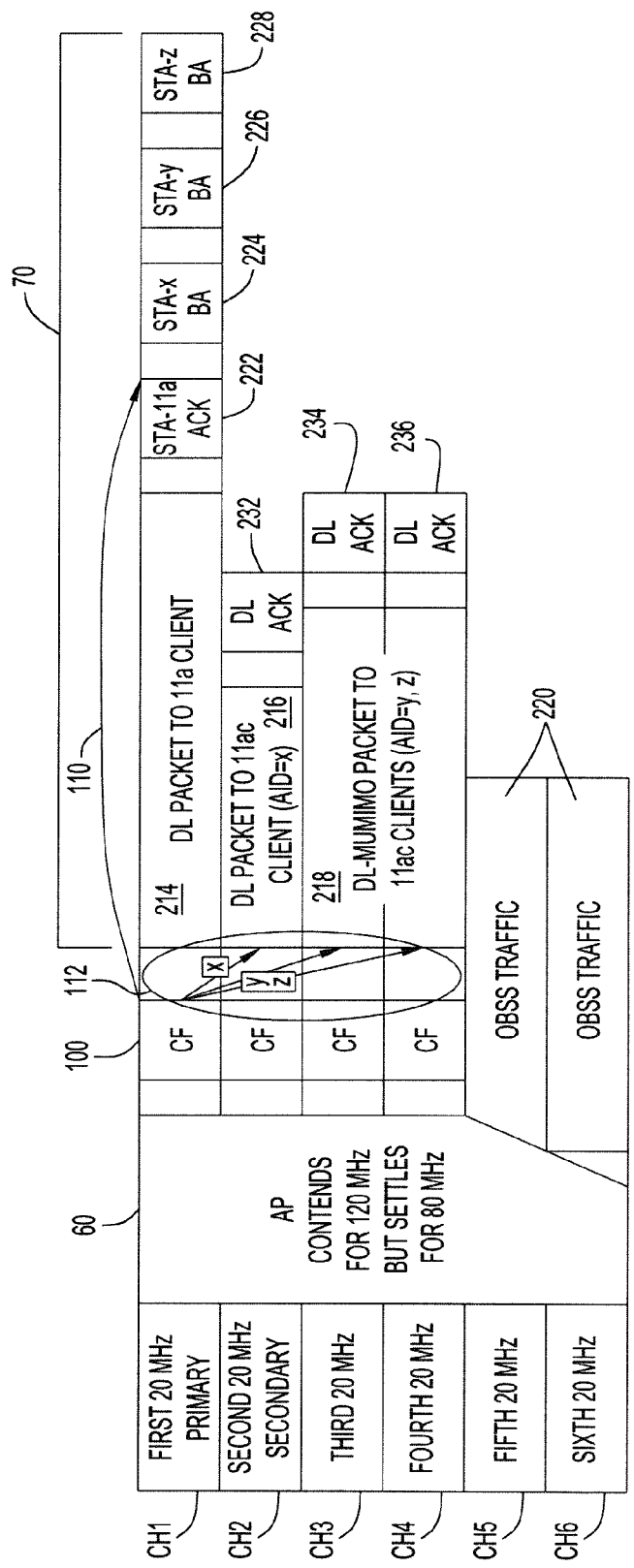
FIG. 8 is a spectrum usage and timing diagram of another example by which an AP is configured to more fully use the spectrum across multiple channels when serving a plurality of client devices of different types.

FIG. 8 illustrates another example where the lower bandwidth legacy client device is an 802.11a client device and there are three 802.11ac clients (referred to as STA-x, STA-y and STA-z in FIG. 8) in the BSS that are destinations during the DL transmission interval. In this example, both DL-OFDMA and DL-MUMIMO is used. There are six channels in this example, denoted CH1, CH2, ..., CH6.

The DL frame to the legacy (lower bandwidth) 802.11a CD is on the primary channel (CH1) and shown at 214. The DL packet to the higher bandwidth CD "x" (STA-x) is on the secondary channel (CH2) and shown at 216. The DL-MUMIMO packet to the higher bandwidth CDs "y" and "z" (STA-y and STA-z) is sent via MU-MIMO on the third and fourth bonded channels, and shown at 218. OBSS traffic is occurring on the fifth and sixth subchannels and shown at 220. The ACKs from the four client devices that are included in the DL transmission interval in this example all occur on the first channel and occur in order of the 802.11a ACK at 222 from the 802.11a client device, followed by the 802.11ac BA from STA-x at 224, followed by the BA of the 802.11ac STA-y at 226 and finally the BA by the 802.11ac STA-z at 228. The AP may also send the optional "fake" DL ACKs as shown at 230, 232, and 234 on the second, third and fourth channels.

In another example, the AP generates control parameters in the control frame for a single user (SU) MIMO downlink transmission to a CD and for a MU-MIMO downlink transmission to multiple CDs. In other words, the DL-OFDA techniques described herein are consistent and capable of supporting both SU-MIMO and MU-MIMO transmissions.

The design of the PHY layer of the AP may be essentially the same as the standards otherwise provide. One exception is that the AP may adaptively adjust power of downlink transmissions transmitted in different channels according to data rate in order to meet rejection channel capabilities of different client devices. For example, legacy packets sent with 64 QAM, ¾, or higher may be amplified by 1-2 dB with respect to 802.11ac constellation points so as not to exceed legacy specifications. In another variation, the AP may be configured to never to send packets at the very highest modulation and coding schemes to legacy devices within a DL transmission interval, and only use modulation and coding schemes with sufficiently tight requirements on adjacent channel interference rejection. At the client device, the receiver can follow its usual process for start-of-packet detection, coarse carrier detection, etc. Indeed, the client device can continue to process the primary channel as usual even if its intended packet lies on one or more of the second, third or fourth channels because it will receive the same information initially on the primary subchannel as it would on the other channels and therefore it need not immediately switch to the other channels.

The techniques described herein provide for an overall increase in the single-BSS bandwidth whenever non-primary frames are longer than the control frame. This is particularly valuable with legacy client devices in an 80 or 160 MHz BSS. The AP only needs to transmit or receive; it never needs to be both transmitting and receiving simultaneously. The AP only needs to contend for the channel once; it does not need multiple MAC contentions to send to multiple CDs. The PHY filtering and processing performed by the AP and client devices is very similar to existing MIMO-OFDM requirements and therefore can be done without special analog (e.g. converter or RF filtering) changes. Moreover, an AP with a single PHY receiver is still capable of performing the techniques described herein. The usage of non-primary channels is minimized so that they can be shared between BSS's.

In sum, a method is provided wherein, at a wireless network access point device, control parameters are generated for usage of a plurality of channels in a bandwidth during a downlink transmission interval, the control parameters comprising information indicating channel assignments that result in multiple downlink transmissions that at least partially overlap in time to different wireless client devices according to their respective bandwidth capabilities. In one form, the control parameters also include information indicating timing for transmissions of acknowledgment messages by higher bandwidth client devices to the access point device. In advance of the downlink transmission interval a control frame containing the control parameters is transmitted by the access point device on each of the plurality of channels in the bandwidth.

In addition, an apparatus is provided comprising at least one transmitter configured to transmit wireless signals in one or more of a plurality of channels in a bandwidth; and a controller configured to be coupled to the at least one transmitter. The controller is configured to generate control parameters for usage of the plurality of channels during a downlink transmission interval, the control parameters comprising information indicating channel assignments resulting in multiple downlink transmissions that at least partially overlap in time to different wireless client devices according to their respective bandwidth capabilities; and supply to the at least one transmitter a control frame containing the control parameters for transmission in advance of the downlink transmission interval on each of the plurality of channels.

Further still, a processor readable medium is provided that stores instructions that, when executed by a processor, cause the processor to: generate control parameters for usage of the plurality of channels during a downlink transmission interval, the control parameters comprising information indicating channel assignments that result in multiple downlink transmissions that at least partially overlap in time to different wireless client devices according to their respective bandwidth capabilities; and supply to at least one transmitter a control frame containing the control parameters for transmission in advance of the downlink transmission interval on each of the plurality of channels.

The above description is by way of example only.

What is claimed is:

1. A method comprising:
at a wireless access point that serves at least first and second wireless devices having lower and higher bandwidth capabilities, respectively:
generating control parameters including information that:
assigns first and second non-overlapping channel bandwidths for first and second downlink transmissions to the first and second wireless devices, respectively; and
indicates timing for an acknowledgement to be sent from the first device and after which an acknowledgement from the second device is to be sent;
transmitting a first downlink transmission to the first device over the first channel bandwidth at a lower data rate during a first time interval;
transmitting a second downlink transmission to the second device over the second channel bandwidth at a higher data rate during a second time interval that partially overlaps with and ends at or before the first time interval; and
transmitting a false acknowledgement message that does not acknowledge anything over the second bandwidth after the second time interval and during the first time interval.

2. The method of claim 1, wherein the wireless access point serves the first device having the lower bandwidth capability and one or more second devices having the higher bandwidth capability, and the generating includes generating control parameters including information to indicate that acknowledgement messages are to be sent from the one or more higher bandwidth second devices in sequence after the acknowledgment from the lower bandwidth first device.

3. The method of claim 2, further comprising, at the wireless access point, receiving acknowledgements from the lower bandwidth first device and the one or more higher bandwidth second devices over the first channel bandwidth assigned to the lower bandwidth first device.

4. The method of claim 3, wherein:
the generating includes generating the control parameters to include information that assigns one or more second non-overlapping channel bandwidths that do not overlap with the first channel bandwidth for downlink transmissions to the one or more higher bandwidth second devices.

5. The method of claim 1, wherein:
the generating includes generating control parameters including information to assign the second channel bandwidth to the higher bandwidth second device as multiple contiguous channels selected from a set of available channels and bonded together; and
the transmitting the false acknowledgement includes transmitting the false acknowledgement over the multiple contiguous channels bonded together.

6. The method of claim 1, wherein the transmitting a second downlink transmission including transmitting a physical layer convergence protocol (PLCP) header in the downlink transmission including a field to identify channels selected from among a set of channels and assigned to the second device, the field including bits encoded so that three bits represents a bandwidth of 80 MHz and five bits represents a bandwidth of 160 MHz.

7. The method of claim 1, further comprising, at the wireless access point, determining the respective bandwidth capabilities of the different devices, wherein the determining includes determining the lower bandwidth first device is a legacy device that operates in accordance with one of an IEEE 802.11a and 802.11n standards and the higher bandwidth device operates in accordance with an IEEE 802.11ac standard.

8. The method of claim 1, further comprising polling at least one of the at least first and second devices for acknowledgements and receiving at least one polled acknowledgements from the at least one of the first and second polled devices.

9. An apparatus comprising:
at least one transmitter and a receiver respectively configured to transmit wireless signals to and receive signals from different wireless devices having different respective bandwidth capabilities; and
a controller configured to be coupled to the at least one transmitter and the receiver, wherein the controller is configured to:
generate control parameters based on the different bandwidth capabilities, the control parameters including information that:
assigns first and second non-overlapping channel bandwidths for first and second downlink transmissions to first and second devices having lower and higher bandwidth capabilities, respectively; and
indicates timing for an acknowledgement to be sent from the first device and after which an acknowledgement from the second device is to be sent;
cause the at least one transmitter to transmit a first downlink transmission to the first device over the first channel bandwidth at a lower data rate during a first time interval;
cause the at least one transmitter to transmit a second downlink transmission to the second device over the second channel bandwidth at a higher data rate during a second time interval that partially overlaps with and ends at or before the first time interval; and
cause the at least one transmitter to transmit a false acknowledgement message that does not acknowledge anything over the second bandwidth after the second time interval and during the first time interval.

10. The apparatus of claim 9, wherein the at least one transmitter is configured to transmit signals to the first device having the lower bandwidth capability and one or more second devices having the lower bandwidth capability, and the controller is configured to generate by generating control parameters including information to indicate that acknowledgement messages are to be sent from the one or more higher bandwidth second devices in sequence after the acknowledgment from the lower bandwidth first device.

11. The apparatus of claim 10, wherein the controller is further configured to receive acknowledgements from the lower bandwidth first device and the one or more higher bandwidth second devices over the first channel bandwidth assigned to the lower bandwidth first device.

12. The apparatus of claim 11, wherein:
the controller is configured to generate by generating the control parameters to include information that assigns one or more second non-overlapping channel bandwidths that do not overlap with the first channel bandwidth for downlink transmissions to the one or more higher bandwidth second devices.

13. The apparatus of claim 9, wherein:
the controller is configured to generate by generating control parameters including information to assign the second channel bandwidth to the higher bandwidth second device as multiple contiguous channels selected from a set of available channels and bonded together; and
the controller is configured to cause the at least one transmitter to transmit by causing the transmitter to transmit the false acknowledgement includes transmitting the false acknowledgement over the multiple contiguous channels bonded together.

14. The apparatus of claim 9, wherein the controller is configured to cause the at least one transmitter to transmit by causing the at least one transmitter to transmit a second downlink transmission including transmitting a physical layer convergence protocol (PLCP) header in the downlink transmission including a field to identify channels selected from among a set of channels and assigned to the second device, the field including bits encoded so that three bits represents a bandwidth of 80 MHz and five bits represents a bandwidth of 160 MHz.

15. The apparatus of claim 9, wherein the controller is further configured to determine the respective bandwidth capabilities of the different devices, wherein the determining includes determining the lower bandwidth first device is a legacy device that operates in accordance with one of an IEEE 802.11a and 802.11n standards and the higher bandwidth device operates in accordance with an IEEE 802.11ac standard.

16. A non-transitory computer readable medium storing instructions that,
when executed by a processor, cause the processor to:
at a wireless access point that serves different wireless devices having different respective bandwidth capabilities, generate control parameters based on the different bandwidth capabilities, the control parameters including information that:
assigns first and second non-overlapping channel bandwidths for first and second downlink transmissions to first and second devices having lower and higher bandwidth capabilities, respectively; and
indicates timing for an acknowledgement to be sent from the first device and after which an acknowledgement from the second device is to be sent;
cause a transmitter to transmit a first downlink transmission to the first device over the first channel bandwidth at a lower data rate during a first time interval; and
cause the transmitter to transmit a second downlink transmission to the second device over the second channel bandwidth at a higher data rate during a second time interval that partially overlaps with and ends at or before the first time interval; and
cause the transmitter to transmit a false acknowledgement message that does not acknowledge anything over the second bandwidth after the second time interval and during the first time interval.

17. The non-transitory computer readable medium of claim 16, wherein the wireless access point serves the first device having the lower bandwidth capability and one or more second devices having the higher bandwidth capability, and the instructions to cause the processor to generate include instructions to cause the processor to generate control parameters including information to indicate that acknowledgement messages are to be sent from the one or more higher bandwidth second devices in sequence after the acknowledgment from the lower bandwidth first device.

18. The non-transitory computer readable medium of claim 17, further comprising instructions to cause the processor to receive acknowledgements from the lower bandwidth first device and the one or more higher bandwidth second devices over the first channel bandwidth assigned to the lower bandwidth first device.

19. The non-transitory computer readable medium of claim 18, wherein:
the instructions to cause the processor to generate include further instructions to cause the processor to generate the control parameters to include information that assigns one or more second non-overlapping channel bandwidths that do not overlap with the first channel bandwidth for downlink transmissions to the one or more higher bandwidth second devices.

20. The non-transitory computer readable medium of claim 16, wherein:
the instructions to cause the processor to generate include instructions to cause the processor to generate control parameters including information to assign the second channel bandwidth to the higher bandwidth second device as multiple contiguous channels selected from a set of available channels and bonded together; and
the instruction to cause the processor to cause the transmitter to transmit the false acknowledgement include instructions to cause the processor to cause the transmitter to transmit the false acknowledgement over the multiple contiguous channels bonded together.

* * * * *